J. H. CAMPBELL.
METHOD AND APPARATUS FOR MANUFACTURING WINDOW GLASS CYLINDERS.
APPLICATION FILED JAN. 3, 1919.
1,312,305.    Patented Aug. 5, 1919.
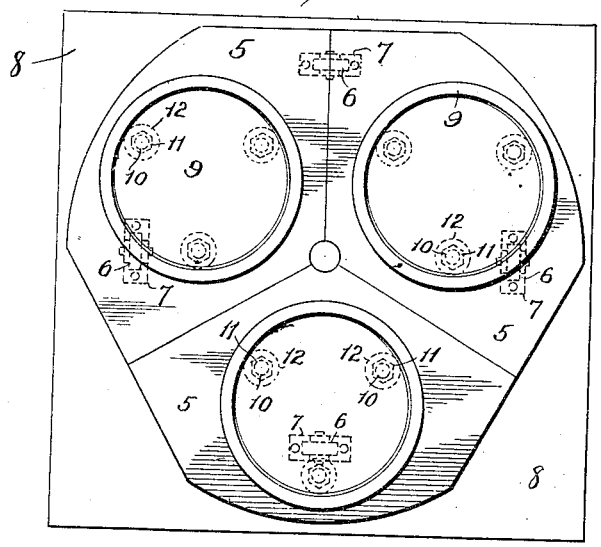
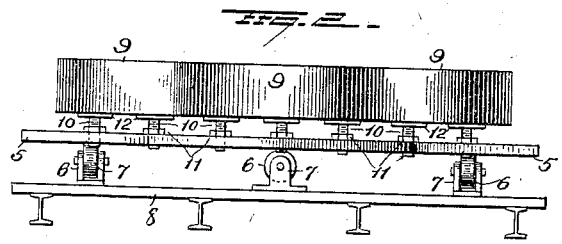
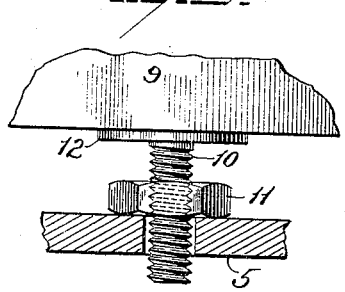

UNITED STATES PATENT OFFICE.

JAMES H. CAMPBELL, OF LANCASTER, OHIO, ASSIGNOR TO THE COLUMBUS GLASS COMPANY, OF LANCASTER, OHIO.

METHOD AND APPARATUS FOR MANUFACTURING WINDOW-GLASS CYLINDERS.

1,312,305.    Specification of Letters Patent.    Patented Aug. 5, 1919.

Application filed January 3, 1919. Serial No. 269,524.

*To all whom it may concern:*

Be it known that I, JAMES H. CAMPBELL, a citizen of the United States, and a resident of Lancaster, in the county of Fairfield and State of Ohio, have invented certain new and useful Improvements in Methods and Apparatus for Manufacturing Window-Glass Cylinders; and I do hereby declare the following to be a full, clear, and exact description of the invention, such as will enable others skilled in the art to which it appertains to make and use the same.

My invention relates to the method of and apparatus for manufacturing window glass cylinders.

It is well known that the effect of variations in surface tension of the glass in a pot is to cause the glass cylinder to move away from the center of the pot toward and into contact with the side of the pot and eventually pull away, and if the variation in surface tension is caused by variation in temperature, the cylinder tends to move toward the point of the greatest attraction.

This variation in the surface tension causes the cylinder to draw to one side of pot which causes it to be thicker on one side than the other, and it has been proposed to compensate for this variation by moving either the pot or the bait laterally, so as to start the draw off center, and continue it off center throughout the draw.

I have discovered that this same result can be obtained, and variations in surface temperature condition of the glass in the pot prevented to a large extent by unleveling or leveling the pot, which may be done before the commencement of the draw, or during he draw, if it be known that conditions are such that the cylinder will move toward one side of the pot, or any other condition exists that will cause the glass to cool at one side faster than at the other, and the object of my invention is to provide means whereby cylinders of approximately uniform thickness will be drawn.

In the accompanying drawings; Figure 1 is a view in plan of a turn table with three pots thereon, the supports for the pots being shown in dotted lines; Fig. 2 is a view in side elevation thereof and Fig. 3 is a view in section, partly in elevation of one of the supports for the pots.

5 represents a turn table mounted to turn on the rollers 6 carried by brackets 7 secured to the base 8. I have shown a turn table with three pots 9 thereon, simply because I have heretofore used three in that way but I would have it understood that my invention is not limited to a turn table with any particular number of pots thereon, or to a pot or pots on a turn table, as the invention would be equally applicable to a pot mounted on a movable truck or to one seated directly over a furnace, or to other fixed support. Where three pots on a turn table are used, they are filled and drawn from in succession, two of the pots being under heating covers or furnaces for heating and draining out the surplus glass, while the third one is being drawn from.

Each pot is supported at a plurality of points preferably three, and I prefer to use as supports, screws 10 passing through holes in the turn table, the holes being larger than the screws and unthreaded so that they will be free to move in said holes, without opposition and without turning. The screws are carried and adjusted up and down by the nuts 11 which rest on the turn table 5, and they preferably carry at their upper ends the metal disks 12 on which the pot rests. The screws are preferably located equi-distant apart, so that a tilting or leveling up of the pot at any point in its circumference can be readily and quickly accomplished, either before, or during a draw, and each is of course adjustable independently of the others.

By adjusting the level of the pot, the effect of different temperatures in the pot, or in the glass in the pot, can be overcome, as by raising one side of the pot it causes the top of the wall of the pot to be higher above the glass level which causes the glass to cool off more slowly at this side and thereby equalize the difference in temperature.

With my improvement the bait or the pot are never moved off center. The outside of the pot will change its relation slightly to the bait, but the center of the pot and the center of the bait will always remain constant so that the bait will always draw approximately from the center of the pot.

By thus controlling the temperature of the glass in the pot, or rather controlling the cooling of the glass in the pot, I prevent the sidewise movement of the cylinder being drawn, and the thick and thin glass which results therefrom.

Having fully described my invention what I claim as new and desire to secure by Letters-Patent, is:—

1. The method of drawing hollow glass articles of substantially uniform thickness consisting in adjusting a side of the pot up or down so as to distribute the glass therein in relation to the walls of the pot in a manner that will result in the equalization of the surface temperature of the glass.

2. In a glass drawing apparatus, the combination of a pot, a support for the latter and a plurality of devices interposed between said pot and its support whereby the pot may be leveled or unleveled.

3. In a glass drawing apparatus, the combination of a pot, and a three point adjustable support for the pot, each point support being adjustable independently of the other.

4. In a glass drawing apparatus, the combination of a pot, a support and a plurality of screws adjustably carried on said support and carrying the pot.

5. In a glass drawing apparatus, the combination of a turn table, a plurality of pots thereon and three point screw supports for each pot, the said screw supports being carried by the turn table and each screw being adjustable independently of the other.

In testimony whereof I have signed this specification in the presence of two subscribing witnesses.

JAMES H. CAMPBELL.

Witnesses:
THOS. S. CUNNINGHAM,
CHAS. H. SMITH.